United States Patent
Matsunaga

(10) Patent No.: US 8,602,074 B2
(45) Date of Patent: Dec. 10, 2013

(54) PNEUMATIC TIRE FOR MOTORCYCLE WITH TREAD WINGS AND WITH SIDEWALLS EACH HAVING INNER LAYER AND OUTER LAYER

(75) Inventor: Satoshi Matsunaga, Kobe (JP)

(73) Assignee: Sumitomo Rubber Industries, Ltd, Kobe (JP)

( * ) Notice: Subject to any disclaimer, the term of this patent is extended or adjusted under 35 U.S.C. 154(b) by 783 days.

(21) Appl. No.: 12/650,969

(22) Filed: Dec. 31, 2009

(65) Prior Publication Data

US 2010/0212801 A1    Aug. 26, 2010

(30) Foreign Application Priority Data

Feb. 24, 2009    (JP) .................................. 2009-040356

(51) Int. Cl.
*B60C 13/00*    (2006.01)

(52) U.S. Cl.
CPC ........... *B60C 13/00* (2013.01); *B60C 2013/006* (2013.04); *B60C 2013/007* (2013.04)
USPC ................... 152/209.5; 152/209.11; 152/454; 152/525; 152/555

(58) Field of Classification Search
USPC ......... 152/525, 454, 209.5, 209.11, 517, 555, 152/458, 541, 546
See application file for complete search history.

(56) References Cited

U.S. PATENT DOCUMENTS

| | | | |
|---|---|---|---|
| 6,619,355 B1 | 9/2003 | Niizato | |
| 2007/0095449 A1 | 5/2007 | Kasai | |

FOREIGN PATENT DOCUMENTS

| | | | |
|---|---|---|---|
| JP | 2-246803 A | | 10/1990 |
| JP | 2000-108612 A | | 4/2000 |
| JP | 2000-335212 A | | 12/2000 |
| JP | 2001138719 A | * | 5/2001 |
| JP | 2007-118824 A | | 5/2007 |

OTHER PUBLICATIONS

English machine translation of JP 2001-138719 A, May 22, 2001.*
Partial English Translation of Japanese Office Action dated Dec. 14, 2010, for Application No. 2009-040356.

* cited by examiner

*Primary Examiner* — Adrienne C Johnstone
(74) *Attorney, Agent, or Firm* — Birch, Stewart, Kolasch & Birch, LLP

(57) ABSTRACT

A tire (34) includes a tread (38), a pair of sidewalls (42), a pair of beads (44), a carcass (46) laid between both of the beads (44) along an inside of the tread (38) and the sidewalls (42), and a pair of wings (40) positioned on an outside in an axial direction of the sidewalls (42) respectively. Each of the sidewalls (42) includes an inner layer (72) positioned on an outside of the carcass (46) in the axial direction and extended in a radial direction along the carcass (46) and an outer layer (74) positioned on a further outside of the inner layer (72) and extended in the radial direction along the inner layer (72). An inner end (82) of the outer layer (74) is positioned on an inside of an inner end (58) of each of the wings (40) in the radial direction. The inner layer (72) has a higher hardness than a hardness of the outer layer (74).

10 Claims, 3 Drawing Sheets

PNEUMATIC TIRE FOR MOTORCYCLE WITH TREAD WINGS AND WITH SIDEWALLS EACH HAVING INNER LAYER AND OUTER LAYER

This application claims priority on Patent Application No. 2009-40356 filed in JAPAN on Feb. 24, 2009, the entire contents of which are hereby incorporated by reference.

BACKGROUND OF THE INVENTION

1. Field of the Invention

The present invention relates to a pneumatic tire for a motorcycle.

2. Description of the Related Art

FIG. 3 is a sectional view showing a part of a conventional pneumatic tire 2 for a motorcycle. The tire 2 includes a tread 4, a wing 6, a sidewall 8, a bead 10, a carcass 12, a band 14, an inner liner 16 and a chafer 18. The tire 2 is of a tubeless type.

The sidewall 8 is extended inward in a radial direction from an end 20 of the tread 4. The sidewall 8 is constituted by a crosslinked rubber having a hardness of approximately 70.

In order to increase a rigidity of a portion of the tire 2 in which the sidewall 8 is positioned, there are investigated specifications, for example, a thickness of the sidewall 8, a position of an end 24 of a carcass ply 22 folded back through the bead 10, and a height of an apex 26 constituting the bead 10. In respect of an enhancement in a productivity and a reduction in a weight, Japanese Laid-Open Patent Publication No. 2007-118824 (US2007/95449) has disclosed an example in which there is investigated a specification of a portion in which a sidewall is positioned.

The tire 2 shown in FIG. 3 assumes such an aspect that an external surface 28 of the sidewall 8 is protruded outward in an axial direction. A thickness of the sidewall 8 portion is peculiar. When the tire 2 is flexed, a specific distortion is generated in this part. The specific distortion influences a rigidity feeling and a grip feeling in accelerating and braking operations.

When the thickness of the sidewall 8 is regulated in order to enhance the rigidity feeling and the grip feeling, a stability against a disturbance and a ride comfort are inhibited. Even if there is regulated a height HT in the radial direction from a bead base line (a solid line BBL in FIG. 3) to the end 24 of the carcass ply 22 which is folded back through the bead 10, the stability against the disturbance and the ride comfort are inhibited. Even if there is regulated a height of the apex 26 which is defined by a height HP in the radial direction from a core 30 of the bead 10 to a tip 32 of the apex 26, the stability against the disturbance and the ride comfort are inhibited.

A rigidity of the tire 2 is regulated based on a flexure confirmed by the tire 2 set into a stationary state. For this reason, it is not easy to obtain the tire 2 in which a rigidity feeling and a grip feeling in driving and braking operations are enhanced without damaging a stability against a disturbance and a ride comfort.

It is an object of the present invention to provide a pneumatic tire for a motorcycle which is excellent in the rigidity feeling and the grip feeling.

SUMMARY OF THE INVENTION

A pneumatic tire for a motorcycle according to the present invention includes a tread having an external surface forming a tread surface, a pair of sidewalls extended almost inward in a radial direction from an end of the tread respectively, a pair of beads positioned on an inside in the radial direction with respect to the sidewalls respectively, a carcass laid between both of the beads along an inside of the tread and the sidewalls, and a pair of wings positioned on the end of the tread and provided on an outside in an axial direction with respect to the sidewalls respectively. Each of the sidewalls includes an inner layer positioned on an outside of the carcass in the axial direction and extended in the radial direction along the carcass and an outer layer positioned on a further outside of the inner layer and extended in the radial direction along the inner layer. An inner end of the outer layer is positioned on an inside of an inner end of each of the wings in the radial direction. A ratio of a thickness of the inner layer to a thickness of the outer layer on an intermediate point within a range from the inner end of the wing to the inner end of the outer layer is equal to or higher than 0.5 and is equal to or lower than 2.0. The inner layer has a higher hardness than a hardness of the outer layer. The hardness of the inner layer is equal to or higher than 85 and is equal to or lower than 95.

It is preferable that the inner end of the wing and the inner end of the outer layer should be positioned on an external surface of the tire in the pneumatic tire for a motorcycle. The external surface from the inner end of the wing to the inner end of the outer layer takes an outward convex curved surface in the axial direction. It is preferable that the curved surface should take a shape of a circular arc in the pneumatic tire for a motorcycle.

It is preferable that a ratio of a height in the radial direction from a bead base line to an outer end of the inner layer to a tire section height should be equal to or higher than 0.4 and should be equal to or lower than 0.6 in the pneumatic tire for a motorcycle. It is preferable that a ratio of a height in the radial direction from the bead base line to the inner end of the outer layer to the tire section height should be equal to or higher than 0.1 and should be equal to or lower than 0.2. It is preferable that the outer end of the inner layer should be positioned on an outside of an outer end of the outer layer in the radial direction. A ratio of a distance in the radial direction from the outer end of the outer layer to the outer end of the inner layer to the tire section height is equal to or higher than 0.05 and is equal to or lower than 0.15. It is preferable that a ratio of a distance in the radial direction from an outer end of the sidewall to the inner end of the wing to the tire section height should be equal to or higher than 0.1 and should be equal to or lower than 0.2. It is preferable that a ratio of a distance in the radial direction from the inner end of the wing to the inner end of the outer layer to the tire section height should be equal to or higher than 0.1 and should be equal to or lower than 0.2.

It is preferable that the hardness of the inner layer should be equal to or higher than 90 in the pneumatic tire for a motorcycle. It is preferable that a complex elastic modulus of the inner layer should be equal to or higher than 20 MPa and should be equal to or lower than 80 MPa. It is preferable that the complex elastic modulus of the inner layer should be equal to or higher than 60 MPa.

In the pneumatic tire for a motorcycle according to the present invention, the sidewall includes the inner layer having the high hardness and the outer layer having the low hardness. There is properly regulated the ratio of the thickness of the inner layer to the thickness of the outer layer on the intermediate point within the range from the inner end of the wing to the inner end of the outer layer. The tire is properly flexed in a running state. Referring to the tire, a formation of a portion having a specific distortion is effectively suppressed in the running state. The tire is excellent in a rigidity feeling and a grip feeling in driving and braking operations. In the tire, an excellent ride comfort can be maintained.

DESCRIPTION OF THE PREFERRED EMBODIMENTS

The present invention will be described below in detail based on a preferred embodiment with reference to the drawings.

Figure 1:
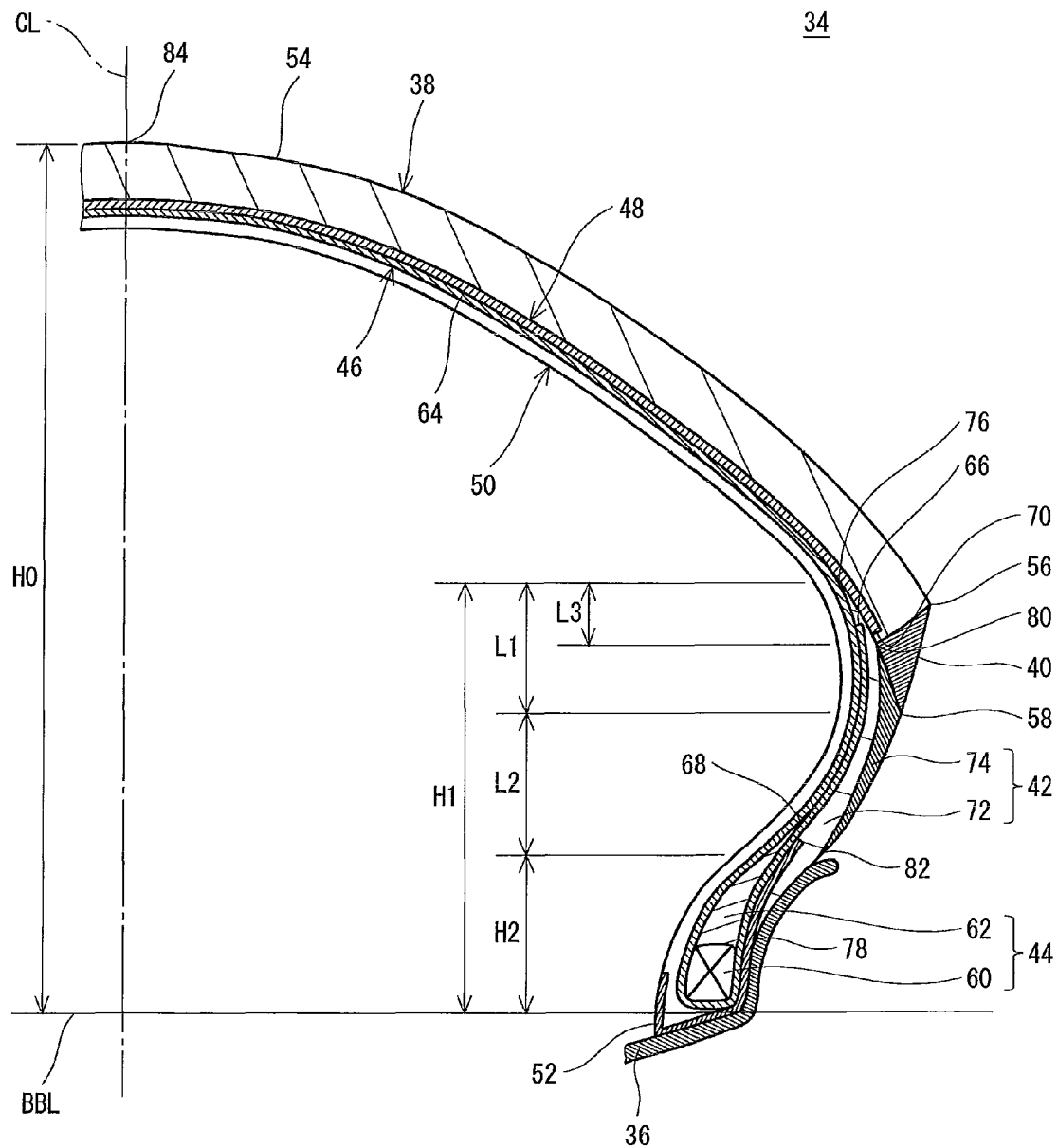
FIG. 1 is a sectional view showing a part of a pneumatic tire according to an embodiment of the present invention.

In FIG. 1, a vertical direction indicates a radial direction, a transverse direction indicates an axial direction, and a perpendicular direction to a paper indicates a circumferential direction. FIG. 1 shows a state in which a tire 34 is incorporated into a rim 36. The tire 34 takes an almost symmetrical shape around a one-dotted chain line CL in FIG. 1. The one-dotted chain line CL represents an equator plane of the tire 34. The tire 34 includes a tread 38, a wing 40, a sidewall 42, a bead 44, a carcass 46, a band 48, an inner liner 50 and a chafer 52. The tire 34 is of a tubeless type. The tire 34 is attached to a motorcycle.

The tread 38 is constituted by a crosslinked rubber which is excellent in an abrasion resistance. The tread 38 takes an outward convex shape in the radial direction. The tread 38 includes a tread surface 54. The tread surface 54 comes in contact with a road surface. A groove is not provided on the tread surface 54. The groove may be provided on the tread surface 54 to form a tread pattern.

The wing 40 takes an inward tapered shape in the axial direction. The wing 40 is positioned on an end 56 of the tread 38. The wing 40 is positioned on an outside in the axial direction of the sidewall 42. The wing 40 couples the tread 38 to the sidewall 42. The wing 40 is constituted by a crosslinked rubber which is excellent in an adhesiveness.

As shown, an external surface of the wing 40 constitutes a part of an external surface of the tire 34. An inner end 58 of the wing 40 which is positioned on an inside in the radial direction is provided on the external surface.

The sidewall 42 is extended almost inward in the radial direction from the end 56 of the tread 38. The sidewall 42 is positioned on an outside in the axial direction with respect to the carcass 46. The sidewall 42 absorbs a shock from the road surface by a flexure. Furthermore, the sidewall 42 prevents an external damage of the carcass 46.

The bead 44 is positioned on an almost inside in the radial direction with respect to the sidewall 42. The bead 44 includes a core 60 and an apex 62 extended outward in the radial direction from the core 60. The core 60 is ring-shaped. The core 60 includes a non-extensible wire (typically, a wire formed of steel). The apex 62 is tapered outward in the radial direction. The apex 62 is constituted by a crosslinked rubber having a high hardness.

The carcass 46 is formed by a carcass ply 64. The carcass ply 64 is laid between the beads 44 on both sides and is provided along an inside of the tread 38 and the sidewall 42. The carcass ply 64 is folded back from an inside toward an outside in the axial direction around the core 60. An end 66 of the carcass ply 64 is positioned on an outside in the radial direction with respect to a tip 68 of the apex 62. The end 66 of the carcass ply 64 is positioned in the vicinity of the end 56 of the tread 38. The carcass ply 64 which is folded back contributes to a rigidity of the tire 34.

The carcass ply 64 is constituted by a large number of cords which are provided in parallel and a topping rubber, which is not shown. An absolute value of an angle formed by each of the cords with respect to the equator plane is usually 70° to 90°. In other words, the carcass 46 has a radial structure. The cord is usually constituted by an organic fiber. Examples of a preferable organic fiber include a polyester fiber, a nylon fiber, a rayon fiber, a polyethylene naphthalate fiber and an aramid fiber. It is also possible to employ the carcass 46 having a bias structure.

The band 48 is positioned on an outside in the radial direction with respect to the carcass 46. The band 48 is positioned on an inside in the radial direction with respect to the tread 38. The band 48 is positioned between the tread 38 and the carcass 46. An end 70 of the band 48 is positioned in the vicinity of the end 56 of the tread 38.

The band 48 is constituted by a cord and a topping rubber, which is not shown. The cord is substantially extended in a circumferential direction and is wound spirally. In the tire 34, an absolute value of an angle formed by the cord with respect to the equator plane is equal to or smaller than 5° and is particularly equal to or smaller than 2°. The band 48 has a so-called jointless structure. The band 48 can contribute to a rigidity in the radial direction of the tire 34. In the tire 34, an influence of a centrifugal force acting in running is suppressed. The cord is usually constituted by an organic fiber. Examples of a preferable organic fiber include a nylon fiber, a polyester fiber, a rayon fiber, a polyethylene naphthalate fiber and an aramid fiber.

The inner liner 50 is bonded to an inner peripheral surface of the carcass 46. The inner liner 50 is constituted by a crosslinked rubber. A rubber having an excellent air insulating property is used for the inner liner 50. The inner liner 50 plays a part in holding an internal pressure of the tire 34.

The chafer 52 is positioned in the vicinity of the bead 44. When the tire 34 is incorporated into the rim 36, the chafer 52 abuts on the rim 36. By the abutment, the vicinity of the bead 44 is protected. The chafer 52 is usually constituted by a cloth and a rubber impregnated into the cloth. It is also possible to use a chafer which is formed by a rubber unit.

Figure 2:
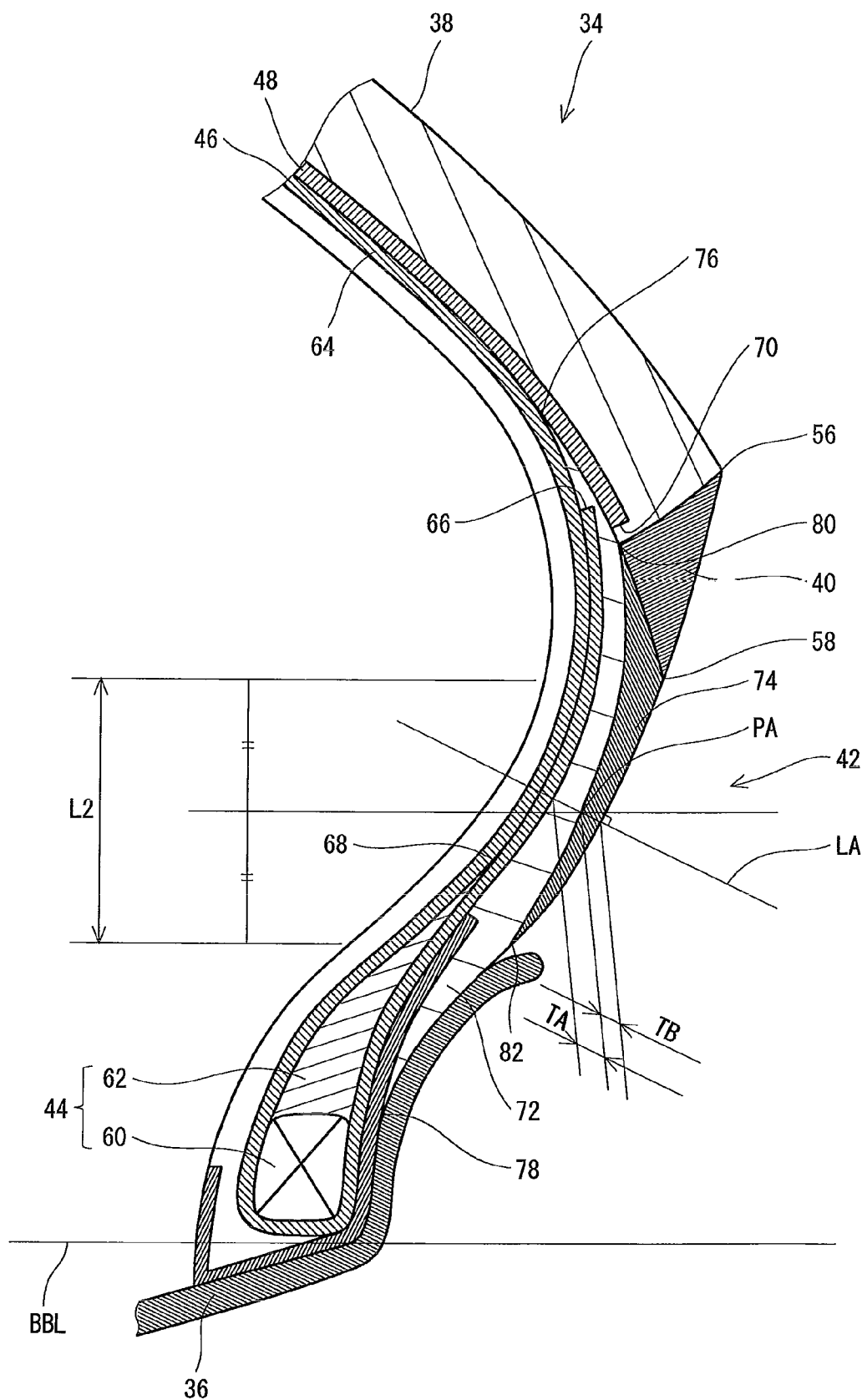
FIG. 2 is an enlarged sectional view showing a part of the tire in FIG. 1.

FIG. 2 is an enlarged sectional view showing a part of the tire 34 in FIG. 1. FIG. 2 shows the sidewall 42 portion of the tire 34. The sidewall 42 includes an inner layer 72 and an outer layer 74.

The inner layer 72 is positioned on an outside in the axial direction with respect to the carcass 46. The inner layer 72 is laminated on the carcass 46. An outer end 76 of the inner layer 72 which is positioned on an outside in the radial direction is provided in the vicinity of the end 56 of the tread 38. In the tire 34, the outer end 76 acts as an outer end of the sidewall 42. The outer end 76 of the inner layer 72 is positioned on an outside in the radial direction with respect to the end 70 of the band 48. The outer end 76 portion is interposed between the carcass 46 and the band 48. An inner end 78 of the inner layer 72 which is positioned on an inside in the radial direction is provided in the vicinity of the core 60 of the bead 44. The inner end 78 is positioned on an external surface of the tire 34.

The inner layer 72 is constituted by a crosslinked rubber. The inner layer 72 has a higher hardness than a hardness of the outer layer 74. The inner layer 72 having the high hardness can contribute to an enhancement in the rigidity of the tire 34. The tire 34 is excellent in a straight running stability and a cornering stability.

As shown, the inner layer 72 is extended in the radial direction along the carcass 46 from the vicinity of the end 56 of the tread 38 toward the vicinity of the core 60 of the bead 44. The inner layer 72 can suppress a distortion caused by an eccentricity of the tire 34. The inner layer 72 can suppress a distortion caused by a rolling motion of the tire 34. The tire 34 is excellent in a rigidity feeling and a grip feeling in accelerating and braking operations.

The outer layer 74 is positioned on an outside in the axial direction with respect to the inner layer 72. The outer layer 74 is laminated on the inner layer 72. The outer layer 74 is extended in the radial direction along the inner layer 72. An outer end 80 of the outer layer 74 which is positioned on the outside in the radial direction is provided on an outside in the radial direction with respect to the inner end 58 of the wing 40. The outer end 80 of the outer layer 74 is positioned on an inside in the radial direction with respect to the outer end 76 of the inner layer 72. An inner end 82 of the outer layer 74 which is positioned on an inside in the radial direction is provided on an inside in the radial direction with respect to the inner end 58 of the wing 40. The inner end 82 of the outer layer 74 is positioned on an outside in the radial direction with respect to the inner end 78 of the inner layer 72. The inner end 82 is positioned on the external surface of the tire 34.

The outer layer 74 is constituted by a crosslinked rubber. The outer layer 74 has a lower hardness than a hardness of the inner layer 72. The outer layer 74 having the low hardness can contribute to a proper flexure of the tire 34. The tire 34 is excellent in a ride comfort.

As shown, the outer end 80 portion of the outer layer 74 is interposed between the inner layer 72 and the wing 40. In the tire 34, a position of the inner end 58 of the wing 40 is properly adjusted so that an effect of the outer layer 74 for the ride comfort is held appropriately. The tire 34 is excellent in the ride comfort.

The outer end 80 of the outer layer 74 is positioned between the outer end 76 of the inner layer 72 and the inner end 58 of the wing 40 in the radial direction. In the tire 34, a distance in the radial direction from the outer end 80 of the outer layer 74 to the outer end 76 of the inner layer 72 is properly regulated so that a rigidity can be prevented from being excessively increased by the outer end 76 portion of the inner layer 72. In the tire 34, an excellent ride comfort can be maintained.

The inner end 82 of the outer layer 74 is positioned in the vicinity of the tip 68 of the apex 62 in the radial direction. In the tire 34, a position of the inner end 82 of the outer layer 74 in the radial direction is adjusted properly so that the rigidity can be prevented from being excessively increased by the inner end 78 portion of the inner layer 72. In the tire 34, an excellent ride comfort can be maintained.

As shown, the external surface extended inward in the radial direction from the end 56 of the tread 38 toward the inner end 82 of the outer layer 74 in the tire 34 takes an outward convex curved surface in the axial direction. In particular, a portion from the inner end 58 of the wing 40 to the inner end 82 of the outer layer 74 over the external surface assumed to have no clincher line takes a shape of a circular arc. In the tire 34, a thickness of the sidewall 42 portion is not peculiar. The tire 34 is properly flexed in the running state. In the tire 34 set into the running state, a formation of a portion having a specific distortion is suppressed effectively. The tire 34 is excellent in the rigidity feeling and the grip feeling in the accelerating and braking operations. In the tire 34, an excellent ride comfort can be maintained.

In FIG. 1, a solid line BBL represents a bead base line. The bead base line indicates a line which defines a rim diameter of the rim 36 to which the tire 34 is to be attached (see JATMA). A double arrow H0 indicates a height in the radial direction from the bead base line to an equator 84 of the tire 34. The height H0 represents a tire section height. A double arrow H1 indicates a height in the radial direction from the bead base line to the outer end 76 of the inner layer 72. A double arrow H2 indicates a height in the radial direction from the bead base line to the inner end 82 of the outer layer 74. A double arrow L1 indicates a distance in the radial direction from the outer end 76 of the inner layer 72 to the inner end 58 of the wing 40. A double arrow L2 indicates a distance in the radial direction from the inner end 58 of the wing 40 to the inner end 82 of the outer layer 74. A double arrow L3 indicates a distance in the radial direction from the outer end 76 of the inner layer 72 to the outer end 80 of the outer layer 74.

In the tire 34, it is preferable that a ratio of the height H1 to the height H0 should be equal to or higher than 0.4 and should be equal to or lower than 0.6. By setting the ratio to be equal to or higher than 0.4, the inner layer 72 can effectively contribute to the rigidity of the tire 34. The tire 34 is excellent in the rigidity feeling and the grip feeling in the accelerating and braking operations From this viewpoint, it is preferable that the ratio should be equal to or higher than 0.45. By setting the ratio to be equal to or lower than 0.6, it is possible to prevent the rigidity from being excessively increased by the inner layer 72. In the tire 34, an excellent ride comfort can be maintained. From this viewpoint, it is more preferable that the ratio should be equal to or lower than 0.55.

In the tire 34, it is preferable that a ratio of the height H2 to the height H0 should be equal to or higher than 0.1 and should be equal to or lower than 0.2. By setting the ratio to be equal to or higher than 0.1, the inner layer 72 can effectively contribute to the rigidity of the tire 34. The tire 34 is excellent in the rigidity feeling and the grip feeling in the accelerating and braking operations. By setting the ratio to be equal to or lower than 0.2, it is possible to prevent the rigidity from being excessively increased by the inner end 78 portion of the inner layer 72. In the tire 34, an excellent ride comfort can be maintained.

In the tire 34, it is preferable that a ratio of the distance L1 to the height H0 should be equal to or higher than 0.1 and should be equal to or lower than 0.2. By setting the ratio to be equal to or higher than 0.1, it is possible to suppress an influence of the outer layer 74 on the rigidity feeling and the grip feeling. By setting the ratio to be equal to or lower than 0.2, the outer layer 74 can effectively contribute to the ride comfort.

In the tire 34, it is preferable that a ratio of the distance L2 to the height H0 should be equal to or higher than 0.1 and should be equal to or lower than 0.2. By setting the ratio to be equal to or higher than 0.1, the outer layer 74 can effectively contribute to the ride comfort. By setting the ratio to be equal to or lower than 0.2, it is possible to suppress the influence of the outer layer 74 on the rigidity feeling and the grip feeling.

In the tire 34, it is preferable that a ratio of the distance L3 to the height H0 should be equal to or higher than 0.05 and should be equal to or lower than 0.15. By setting the ratio to be equal to or higher than 0.05, the inner layer 72 can effectively contribute to the rigidity of the tire 34. The tire 34 is excellent in the rigidity feeling and the grip feeling in the accelerating and braking operations. By setting the ratio to be equal to or lower than 0.15, it is possible to prevent the rigidity from being excessively increased by the inner end 78 portion of the inner layer 72. In the tire 34, an excellent ride comfort can be maintained.

In FIG. 2, a point PA indicates a point on a boundary between the outer layer 74 and the inner layer 72. The point PA is positioned on a center of the distance L2 in the radial direction from the inner end 58 of the wing 40 to the inner end 82 of the outer layer 74. A solid line LA is a straight line passing through the point PA and crossing the external surface of the tire 34 perpendicularly. A double arrow TA indicates a thickness of the inner layer 72 which is measured along the straight line LA. The thickness TA represents the thickness of the inner layer 72 on an intermediate point within a range from the inner end 58 of the wing 40 to the inner end 82 of the outer layer 74. A double arrow TB indicates a thickness of the outer layer 74 which is measured along the straight line LA. The thickness TB represents the thickness of the outer layer 74 on the intermediate point within the range from the inner end 58 of the wing 40 to the inner end 82 of the outer layer 74.

In the tire 34, in order to obtain a rigidity feeling and a grip feeling which are excellent, it is preferable that a ratio of the thickness TA to the thickness TB should be higher than 0.5. The ratio is more preferably equal to or higher than 0.6 and is particularly preferably equal to or higher than 1.0. In order to maintain an excellent ride comfort, the ratio is preferably equal to or lower than 2.0 and is more preferably equal to or lower than 1.67.

In order to obtain the rigidity feeling and the grip feeling which are excellent, the thickness TA is preferably equal to or greater than 1.5 mm and is more preferably equal to or greater than 2.0 mm. In order to maintain the excellent ride comfort, it is preferable that the thickness TA should be equal to or smaller than 2.5 mm.

In order to obtain the excellent ride comfort, the thickness TB is preferably equal to or greater than 1.0 mm and is more preferably equal to or greater than 1.5 mm. In order to suppress the influence of the outer layer 74 on the rigidity feeling and the grip feeling, the thickness TB is preferably equal to or smaller than 2.5 mm and is more preferably equal to or smaller than 2.0 mm.

In the tire 34, it is preferable that a hardness HA of the inner layer 72 should be equal to or higher than 85 and should be equal to or lower than 95. By setting the hardness HA to be equal to or higher than 85, the inner layer 72 can effectively contribute to the rigidity feeling and the grip feeling in the accelerating and braking operations. From this viewpoint, the hardness HA is more preferably equal to or higher than 90 and is particularly preferably equal to or higher than 92. By setting the hardness HA to be equal to or lower than 95, it is possible to prevent the rigidity from being excessively increased by the inner layer 72. In the tire 34, it is possible to maintain the excellent ride comfort.

In the present invention, the hardness HA is measured by a durometer of a type A in accordance with "JIS K 6253". The hardness HA is measured on a condition that a temperature is set to be 23° C. In the measurement, there is used a specimen which is formed by crosslinking a rubber composition constituting the inner layer 72. The specimen is obtained by holding the rubber composition for 10 minutes in a mold having a temperature of 160° C. A hardness HB of the outer layer 74 which will be described below is also measured in the same manner.

It is preferable that the hardness HB of the outer layer 74 should be equal to or higher than 65 and should be equal to or lower than 75. By setting the hardness HB to be equal to or higher than 65, the outer layer 74 can properly contribute to the rigidity of the tire 34. In the tire 34, it is possible to maintain the rigidity feeling and the grip feeling which are excellent. By setting the hardness HB to be equal to or lower than 75, the outer layer 74 can effectively contribute to the ride comfort.

In the tire 34 set into the running state, in order to effectively suppress a formation of a portion having a peculiar distortion, a difference (HA−HB) between the hardness HA of the inner layer 72 and the hardness HE of the outer layer 74 is preferably equal to or greater than 20 and is more preferably equal to or greater than 22. The difference (HA−HB) is preferably equal to or smaller than 30 and is more preferably equal to or smaller than 29. The tire 34 is excellent in the ride comfort. The tire 34 is excellent in the rigidity feeling and the grip feeling in the accelerating and braking operations.

It is preferable that a complex elastic modulus EA of the inner layer 72 should be equal to or higher than 20 MPa and should be equal to or lower than 80 MPa. By setting the complex elastic modulus EA to be equal to or higher than 20 MPa, the inner layer 72 can effectively contribute to the rigidity feeling and the grip feeling in the accelerating and braking operations. From this viewpoint, the complex elastic modulus EA is more preferably equal to or higher than 21 MPa and is particularly preferably equal to or higher than 60 MPa. By setting the complex elastic modulus EA to be equal to or lower than 80 MPa, it is possible to prevent the rigidity from being excessively increased by the inner layer 72. In the tire 34, it is possible to maintain the excellent ride comfort. From this viewpoint, it is more preferable that the complex elastic modulus EA should be equal to or lower than 78 MPa.

In the present invention, the complex elastic modulus EA of the inner layer 72 and a complex elastic modulus EB of the outer layer 74 which will be described below are measured on the following conditions by using a viscoelastic spectrometer (manufactured by IWAMOTO SEISAKUSHO CO., LTD.) in accordance with the rules of "JIS K 6394".

Initial distortion: 10%
Amplitude: ±1%
Frequency: 10 Hz
Deforming mode: tension
Measuring temperature: 70° C.

A specimen to be used for the measurement through the viscoelastic spectrometer is plate-shaped, and has a length of 45 mm, a width of 4 mm and a thickness of 2 mm. Both ends of the specimen are chucked and the measurement is thus carried out. A displaced part of the specimen has a length of 30 mm. The specimen is cut out of the tire 34. The specimen cut out of the tire 34 is used for measuring the complex elastic modulus EA. In the case in which it is hard to cut the specimen out, the specimen is punched out of a slab obtained by holding the rubber composition constituting the inner layer 72 for 10 minutes in a mold having a temperature of 160° C. A specimen to be used for measuring the complex elastic modulus EB of the outer layer 74 is also prepared in the same manner.

It is preferable that the complex elastic modulus EB of the outer layer 74 should be equal to or higher than 4.0 MPa and should be equal to or lower than 5.0 MPa. By setting the complex elastic modulus EB to be equal to or higher than 4.0 MPa, the outer layer 74 can properly contribute to the rigidity of the tire 34. In the tire 34, it is possible to maintain the rigidity feeling and the grip feeling which are excellent. By setting the complex elastic modulus EB to be equal to or lower than 5.0 MPa, the outer layer 74 can effectively contribute to the ride comfort.

In the present invention, the dimension and the angle in each member of the tire 34 are measured in a state in which the tire 34 is incorporated in a normal rim and is filled with air to obtain a normal internal pressure. During the measurement, a load is not applied to the tire 34. In this specification, the normal rim implies a rim determined in rules on which the tire 34 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 34 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure.

EXAMPLES

Although the effects of the present invention will be apparent from examples, the present invention should not be construed to be restrictive based on description of the examples.

Example 1

There was obtained a pneumatic tire for a motorcycle according to an example 1 which has the basic structure illustrated in FIG. 1 and a specification shown in the following Table 2. The tire has a size of "190/50 ZR17". A carcass of the tire is constituted by a single carcass ply. The carcass ply is folded back from an inside toward an outside in an axial direction around a bead. A height in a radial direction from a bead base line to an end of the carcass ply which was folded back was set to be 40 mm. A height in the radial direction of an apex was set to be 10 mm. In a state in which the tire is incorporated into a rim and is filled with air, the tire has such a structure that an external surface from an inner end of a wing to an inner end of an outer layer of a sidewall takes an outward convex curved surface (taking a shape of a circular arc) in the axial direction. The structure is indicated as "A" in a column of a shape of an external surface in the Table 2.

Examples 5 to 14

A tire was obtained in the same manner as in the example 1 except that a ratio (H1/H0) of a height H1 in a radial direction from a bead base line to an outer end of an inner layer to a tire section height H0, a ratio (H2/H0) of a height H2 in the radial direction from the bead base line to an inner end of an outer layer to the tire section height H0, a ratio (L1/H0) of a distance L1 in the radial direction from the outer end of the inner layer to an inner end of a wing to the tire section height H0, a ratio (L2/H0) of a distance L2 in the radial direction from the inner end of the wing to the inner end of the outer layer to the tire section height H0, and a ratio (L3/H0) of a distance L3 in the radial direction from the outer end of the inner layer to an outer end of the outer layer to the tire section height H0 were set as shown in the following Tables 2 and 3.

Examples 4, 15 and 16 and Comparative Examples 3 and 4

A tire was obtained in the same manner as in the example 1 except that a thickness TA of an inner layer and a thickness TB of an outer layer in a center within a range from an inner end of a wing to an inner end of the outer layer were varied to set a ratio (TA/TB) of the thickness TA to the thickness TB as shown in the following Tables 2 and 3.

Examples 3 and 17 and Comparative Example 2

A tire was obtained in the same manner as in the example 1 except that a hardness HA and a complex elastic modulus EA in an inner layer were set as shown in the following Tables 1 and 3.

Example 2

Figure 3:
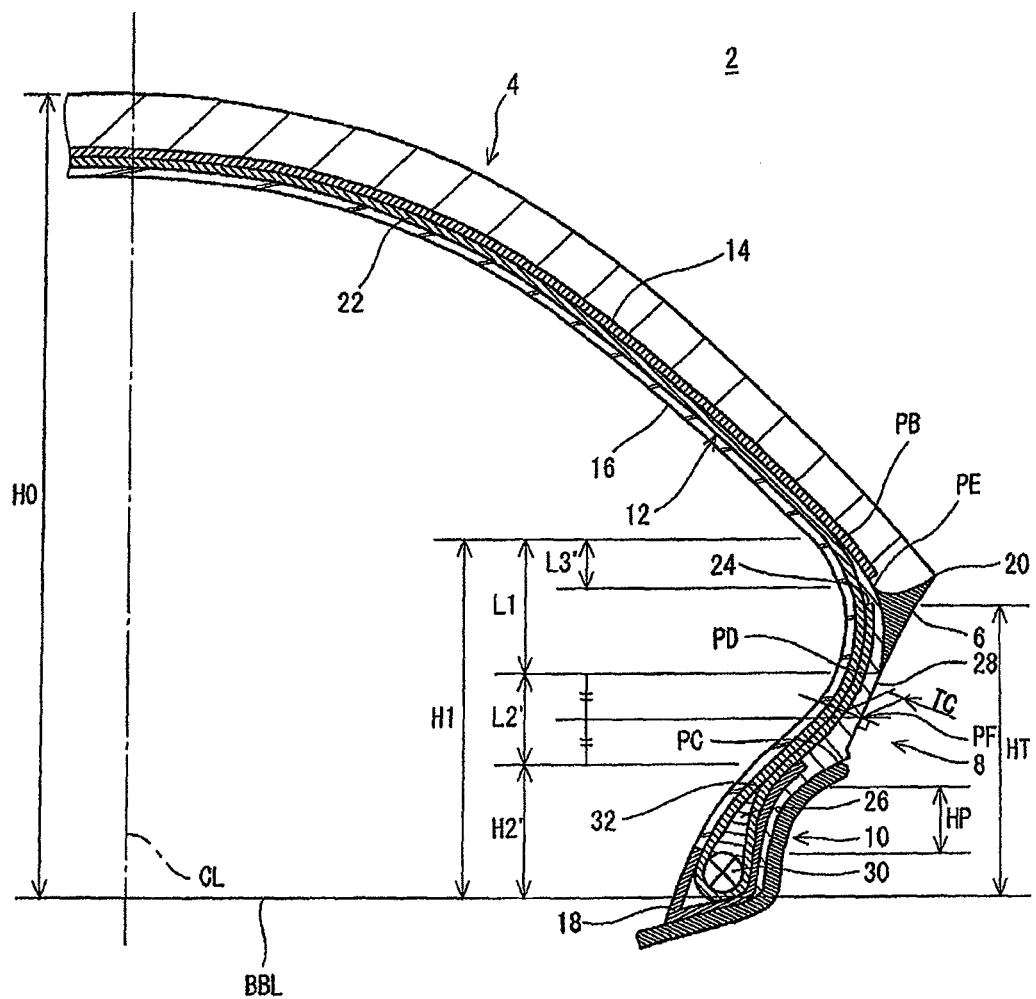
FIG. 3 is a sectional view showing a part of a conventional pneumatic tire for a motorcycle.

A tire was obtained in the same manner as in the example 1 except that a projection protruded outward in an axial direction was provided on an outer layer as in the tire shown in FIG. 3. The structure is indicated as "B" in a column of a shape of an external surface in the Table 1.

Example 18

A tire was obtained in the same manner as in the example 1 except that a carcass was constituted by two carcass plies.

Comparative Example 1

In a comparative example 1, there is employed a conventional tire put on the market. In the comparative example 1, the basic structure shown in FIG. 3 is provided. A carcass is formed by a single carcass ply. The carcass ply is folded back from an inside toward an outside in an axial direction around a bead. A height HT in a radial direction from a bead baseline (the solid line BBL in FIG. 3) to an end of the carcass ply was set to be 40 mm. A height HP in the radial direction of an apex constituting the bead was set to be 10 mm. A ratio (H1/H0) of a height H1 in the radial direction from the bead base line to an outer end PB of a sidewall to a tire section height H0 was set to be 0.45. A ratio (H2'/H0) of a height H2' in the radial direction from the bead base line to an outer end PC of a flange to the tire section height H0 was set to be 0.15. A ratio (L1/H0) of a distance L1 in the radial direction from an outer end PB to an inner end PD of a wing to the tire section height H0 was set to be 0.15. A ratio (L2'/H0) of a distance L2' in the radial direction from the inner end PD to the outer end PC to the tire section height H0 was set to be 0.15. A ratio (L3'/H0) of a distance L3' in the radial direction from the outer end PB to a tip PE of the wing to the tire section height H0 was set to be 0.1. A hardness HC of the sidewall was set to be 63. A complex elastic modulus EC of the sidewall was set to be 4.5 MPa. A thickness TC of the sidewall was set to be 2.0 mm. The thickness TC was measured along a straight line which passes through a point PF positioned on a center of the distance L2' in the radial direction and is orthogonal to an external surface of the tire. The thickness TC represents a thickness of the sidewall on an intermediate point within a range from the inner end PD to the outer end PC. In the comparative example 1, there is employed a structure in which a projection protruded outward in the axial direction is provided on the sidewall. Therefore, the structure is indicated as "B" in the column of the shape of the external surface in the Table 1.

[Running Test]

A trial tire was attached to a rear wheel of a motorcycle (four cycles) on the market which has a displacement of 1000 cc. A rim was set to be MT17×6.00 and an internal pressure of air of the tire was set to be 290 kPa. A conventional tire on the market is attached to a front wheel. A tire size of the front wheel is "120/70 ZR17". A rim is set to be MT17×3.50 and an internal pressure of air of the tire is set to be 250 kPa. A running test (a sensuous evaluation) related to a rigidity feeling, a grip feeling, a straight running stability, a cornering stability and a ride comfort was carried out by a rider over a circuit course constituted by a dry asphalt path. The result is expressed in an index number with a full mark of five. It is indicated that a greater numeric value is more excellent. The result is shown in the following Tables 1, 2 and 3.

[Evaluation of Rigidity of Tire]

A trial tire was attached to a testing machine to evaluate a rigidity of a sidewall. The testing machine includes 12 plates disposed along a tread surface of the tire and a rim for incorporating the tire. After the tire was incorporated into the rim, the tire was filled with air and an internal pressure thereof was set to be 290 kPa. The respective plates were caused to abut on the tread surface and the tread was constrained by the plates. The rim was brought downward and was made eccentric to measure a relationship between a flexure of the tire which is caused by the eccentricity and a load. A ratio of a variation in the load to a variation in the flexure is shown as a flexure index with an index number in the comparative example 1 set to be 100 in the following Tables 1, 2 and 3. The rim was rotated around an axis to twist the tire and a relationship between a deformation of the tire and the load was thus measured. A ratio of the variation in the load to an amount of movement of the rim is shown as a torsion index with an index number in the comparative example 1 set to be 100 in the following Tables 1, 2 and 3. Index numbers having greater numeric values represent a higher rigidity.

TABLE 1

Specification of Tire and Result of Evaluation

| | Comp. example 1 | Example 2 | Comp. example 2 | Example 3 |
|---|---|---|---|---|
| Number of carcass plies | 1 | 1 | 1 | 1 |
| Shape of external surface | B | B | A | A |
| Inner layer Hardness HA | — | 92 | 78 | 85 |
| Elastic modulus EA [MPa] | — | 63 | 12.5 | 21 |

TABLE 1-continued

Specification of Tire and Result of Evaluation

|  |  | Comp. example 1 | Example 2 | Comp. example 2 | Example 3 |
|---|---|---|---|---|---|
|  | Thickness TA [mm] | — | 2.0 | 2.0 | 2.0 |
| Outer layer | Hardness HB | — | 63 | 63 | 63 |
|  | Elastic modulus EB [MPa] | — | 4.5 | 4.5 | 4.5 |
|  | Thickness TB [mm] | — | 2.0 | 2.0 | 2.0 |
| Hardness HC |  | 63 | — | — | — |
| Elastic modulus EC [MPa] |  | 4.5 | — | — | — |
| Thickness TC [mm] |  | 2.0 | — | — | — |
| Ratio (TA/TB) |  | — | 1.0 | 1.0 | 1.0 |
| Ratio (H1/H0) |  | 0.45 | 0.45 | 0.45 | 0.45 |
| Ratio (H2/H0) |  | — | 0.15 | 0.15 | 0.15 |
| Ratio (L2/H0) |  | — | 0.15 | 0.15 | 0.15 |
| Ratio (L1/H0) |  | 0.15 | 0.15 | 0.15 | 0.15 |
| Ratio (L3/H0) |  | — | 0.1 | 0.1 | 0.1 |
| Ratio (H2'/H0) |  | 0.15 | — | — | — |
| Ratio (L2'/H0) |  | 0.15 | — | — | — |
| Ratio (L3'/H0) |  | 0.1 | — | — | — |
| Rigidity feeling |  | 3.0 | 3.5 | 3.5 | 4.5 |
| Grip feeling |  | 3.5 | 4.0 | 3.5 | 4.0 |
| Straight running stability |  | 4.0 | 4.0 | 4.5 | 4.5 |
| Cornering stability |  | 4.0 | 3.5 | 4.5 | 4.5 |
| Ride comfort |  | 4.5 | 3.5 | 4.0 | 4.5 |
| Flexure index |  | 100 | 115 | 100 | 102 |
| Torsion index |  | 100 | 125 | 110 | 115 |

TABLE 2

Specification of Tire and Result of Evaluation

|  |  | Comp. example 3 | Example 4 | Example 5 | Example 6 | Example 7 | Example 8 | Example 1 | Example 9 | Example 10 |
|---|---|---|---|---|---|---|---|---|---|---|
| Number of carcass plies |  | 1 | 1 | 1 | 1 | 1 | 1 | 1 | 1 | 1 |
| Shape of external surface |  | A | A | A | A | A | A | A | A | A |
| Inner layer | Hardness HA | 92 | 92 | 92 | 92 | 92 | 92 | 92 | 92 | 92 |
|  | Elastic modulus EA [MPa] | 63 | 63 | 63 | 63 | 63 | 63 | 63 | 63 | 63 |
|  | Thickness TA [mm] | 1.0 | 1.5 | 2.0 | 2.0 | 2.0 | 2.0 | 2.0 | 2.0 | 2.0 |
| Outer layer | Hardness HB | 63 | 63 | 63 | 63 | 63 | 63 | 63 | 63 | 63 |
|  | Elastic modulus EB [MPa] | 4.5 | 4.5 | 4.5 | 4.5 | 4.5 | 4.5 | 4.5 | 4.5 | 4.5 |
|  | Thickness TB [mm] | 3.0 | 2.5 | 2.0 | 2.0 | 2.0 | 2.0 | 2.0 | 2.0 | 2.0 |
| Ratio (TA/TB) |  | 0.33 | 0.6 | 1.0 | 1.0 | 1.0 | 1.0 | 1.0 | 1.0 | 1.0 |
| Ratio (H1/H0) |  | 0.45 | 0.45 | 0.4 | 0.4 | 0.4 | 0.45 | 0.45 | 0.45 | 0.5 |
| Ratio (H2/H0) |  | 0.15 | 0.15 | 0.1 | 0.15 | 0.15 | 0.15 | 0.15 | 0.15 | 0.15 |
| Ratio (L2/H0) |  | 0.15 | 0.15 | 0.15 | 0.1 | 0.15 | 0.15 | 0.15 | 0.15 | 0.15 |
| Ratio (L1/H0) |  | 0.15 | 0.15 | 0.15 | 0.15 | 0.1 | 0.15 | 0.15 | 0.15 | 0.2 |
| Ratio (L3/H0) |  | 0.1 | 0.1 | 0.1 | 0.1 | 0.1 | 0.05 | 0.1 | 0.15 | 0.1 |
| Rigidity feeling |  | 4.0 | 4.5 | 4.5 | 4.5 | 4.5 | 4.5 | 4.5 | 4.5 | 4.5 |
| Grip feeling |  | 3.5 | 4.5 | 4.5 | 4.0 | 4.0 | 4.0 | 4.5 | 4.0 | 4.5 |
| Straight running stability |  | 4.0 | 4.0 | 4.0 | 4.0 | 4.0 | 4.0 | 4.5 | 4.0 | 4.5 |
| Cornering stability |  | 3.5 | 4.0 | 4.5 | 4.5 | 4.5 | 4.5 | 4.5 | 4.5 | 4.5 |
| Ride comfort |  | 4.5 | 4.5 | 4.5 | 4.0 | 4.5 | 3.5 | 4.5 | 3.5 | 4.5 |
| Flexure index |  | 100 | 102 | 110 | 107 | 110 | 105 | 105 | 107 | 110 |
| Torsion index |  | 105 | 120 | 122 | 118 | 120 | 120 | 123 | 128 | 125 |

TABLE 3

Specification of Tire and Result of Evaluation

|  |  | Example 11 | Example 12 | Example 13 | Example 14 | Example 15 | Example 16 | Comp. example 4 | Example 17 | Example 18 |
|---|---|---|---|---|---|---|---|---|---|---|
| Number of carcass plies |  | 1 | 1 | 1 | 1 | 1 | 1 | 1 | 1 | 2 |
| Shape of external surface |  | A | A | A | A | A | A | A | A | A |
| Inner layer | Hardness HA | 92 | 92 | 92 | 92 | 92 | 92 | 92 | 95 | 92 |
|  | Elastic modulus EA [MPa] | 63 | 63 | 63 | 63 | 63 | 63 | 63 | 78 | 63 |
|  | Thickness TA [mm] | 2.0 | 2.0 | 2.0 | 2.0 | 2.5 | 2.0 | 3.0 | 2.0 | 2.0 |
| Outer layer | Hardness HB | 63 | 63 | 63 | 63 | 63 | 63 | 63 | 63 | 63 |
|  | Elastic modulus EB [MPa] | 4.5 | 4.5 | 4.5 | 4.5 | 4.5 | 4.5 | 4.5 | 4.5 | 4.5 |
|  | Thickness TB [mm] | 2.0 | 2.0 | 2.0 | 2.0 | 1.5 | 1.0 | 1.0 | 2.0 | 2.0 |
| Ratio (TA/TB) |  | 1.0 | 1.0 | 1.0 | 1.0 | 1.67 | 2 | 3 | 1 | 1 |
| Ratio (H1/H0) |  | 0.5 | 0.5 | 0.55 | 0.6 | 0.45 | 0.45 | 0.45 | 0.45 | 0.45 |
| Ratio (H2/H0) |  | 0.15 | 0.2 | 0.2 | 0.2 | 0.15 | 0.15 | 0.15 | 0.15 | 0.15 |
| Ratio (L2/H0) |  | 0.2 | 0.15 | 0.15 | 0.2 | 0.15 | 0.15 | 0.15 | 0.15 | 0.15 |
| Ratio (L1/H0) |  | 0.15 | 0.15 | 0.2 | 0.2 | 0.15 | 0.15 | 0.15 | 0.15 | 0.15 |
| Ratio (L3/H0) |  | 0.1 | 0.1 | 0.1 | 0.1 | 0.1 | 0.1 | 0.1 | 0.1 | 0.1 |

TABLE 3-continued

Specification of Tire and Result of Evaluation

|  | Example 11 | Example 12 | Example 13 | Example 14 | Example 15 | Example 16 | Comp. example 4 | Example 17 | Example 18 |
|---|---|---|---|---|---|---|---|---|---|
| Rigidity feeling | 4.5 | 4.5 | 4.5 | 4.5 | 4.0 | 4.5 | 4.0 | 4.5 | 4.0 |
| Grip feeling | 4.5 | 4.0 | 4.5 | 4.5 | 4.5 | 4.5 | 3.5 | 4.5 | 4.5 |
| Straight running stability | 4.5 | 4.0 | 4.5 | 4.5 | 4.5 | 4.5 | 4.0 | 4.5 | 4.5 |
| Cornering stability | 4.5 | 4.5 | 4.5 | 4.5 | 4.0 | 4.5 | 3.5 | 4.5 | 4.5 |
| Ride comfort | 4.5 | 3.5 | 4.0 | 4.5 | 4.0 | 4.5 | 3.5 | 4.0 | 4.0 |
| Flexure index | 110 | 110 | 110 | 113 | 110 | 103 | 115 | 108 | 110 |
| Torsion index | 115 | 120 | 120 | 122 | 125 | 115 | 125 | 128 | 130 |

As shown in the Tables 1, 2 and 3, a higher evaluation is obtained in the tire according to each of the examples as compared with the tire according to each of the comparative examples. From the result of the evaluation, the advantage of the present invention is apparent. The present invention can also be applied to various pneumatic tires for a motorcycle.

The above description is only illustrative and various changes can be made without departing from the scope of the present invention.

What is claimed is:

1. A pneumatic tire for a motorcycle comprising a tread having an external surface forming a tread surface, a pair of sidewalls extended almost inward in a radial direction from an end of the tread respectively, a pair of beads positioned on an inside in the radial direction with respect to the sidewalls respectively, a carcass laid between both of the beads along an inside of the tread and the sidewalls, and a pair of wings positioned on the end of the tread and provided on an outside in an axial direction with respect to the sidewalls respectively, wherein each of the sidewalls includes an inner layer positioned on an outside of the carcass in the axial direction and extended in the radial direction along the carcass and an outer layer positioned on a further outside of the inner layer and extended in the radial direction along the inner layer, an inner end of the outer layer is positioned on an inside of an inner end of each of the wings in the radial direction, an outer end of the inner layer is positioned on an outside of an outer end of the outer layer in the radial direction, a ratio of a thickness of the inner layer to a thickness of the outer layer on an intermediate point positioned on a boundary between the outer layer and the inner layer at a center of a distance in the radial direction from the inner end of the wing to the inner end of the outer layer is equal to or higher than 0.5 and is equal to or lower than 2.0, the thicknesses being measured along a straight line passing through the intermediate point and crossing the external surface of the tire perpendicularly, a ratio of a distance in the radial direction from the outer end of the outer layer to the outer end of the inner layer to a tire section height is equal to or higher than 0.05 and is equal to or lower than 0.15, the inner layer has a higher hardness than a hardness of the outer layer, and the hardness of the inner layer is equal to or higher than 85 and is equal to or lower than 95.

2. The pneumatic tire for a motorcycle according to claim 1, wherein the inner end of the wing and the inner end of the outer layer are positioned on an external surface of the tire, and the entire external surface from the inner end of the wing to the inner end of the outer layer is an outward convex curved surface in the axial direction.

3. The pneumatic tire for a motorcycle according to claim 2, wherein the curved surface takes a shape of a circular arc.

4. The pneumatic tire for a motorcycle according to claim 1, wherein a ratio of a height in the radial direction from a bead base line to an outer end of the inner layer to a tire section height is equal to or higher than 0.4 and is equal to or lower than 0.6.

5. The pneumatic tire for a motorcycle according to claim 1, wherein a ratio of a height in the radial direction from a bead base line to the inner end of the outer layer to a tire section height is equal to or higher than 0.1 and is equal to or lower than 0.2.

6. The pneumatic tire for a motorcycle according to claim 1, wherein a ratio of a distance in the radial direction from an outer end of the sidewall to the inner end of the wing to a tire section height is equal to or higher than 0.1 and is equal to or lower than 0.2.

7. The pneumatic tire for a motorcycle according to claim 1, wherein a ratio of a distance in the radial direction from the inner end of the wing to the inner end of the outer layer to a tire section height is equal to or higher than 0.1 and is equal to or lower than 0.2.

8. The pneumatic tire for a motorcycle according to claim 1, wherein the hardness of the inner layer is equal to or higher than 90.

9. The pneumatic tire for a motorcycle according to claim 1, wherein a complex elastic modulus of the inner layer is equal to or higher than 20 MPa and is equal to or lower than 80 MPa.

10. The pneumatic tire for a motorcycle according to claim 9, wherein the complex elastic modulus of the inner layer is equal to or higher than 60 MPa.

* * * * *